US010747301B2

(12) United States Patent
Shipes et al.

(10) Patent No.: US 10,747,301 B2
(45) Date of Patent: Aug. 18, 2020

(54) AUGMENTED REALITY SYSTEM WITH SPATIALIZED AUDIO TIED TO USER MANIPULATED VIRTUAL OBJECT

(71) Applicant: MAGIC LEAP, INC., Plantation, FL (US)

(72) Inventors: Brett Shipes, Fort Lauderdale, FL (US); Marc Alan McCall, Plantation, FL (US)

(73) Assignee: MAGIC LEAP, INC., Plantation, FL (US)

( * ) Notice: Subject to any disclaimer, the term of this patent is extended or adjusted under 35 U.S.C. 154(b) by 71 days.

(21) Appl. No.: 15/937,721

(22) Filed: Mar. 27, 2018

(65) Prior Publication Data
US 2018/0284882 A1 Oct. 4, 2018

Related U.S. Application Data

(60) Provisional application No. 62/477,976, filed on Mar. 28, 2017.

(51) Int. Cl.
*G06F 3/01* (2006.01)
*H04S 7/00* (2006.01)
(Continued)

(52) U.S. Cl.
CPC ............ *G06F 3/011* (2013.01); *G02B 27/017* (2013.01); *G06F 3/012* (2013.01); *G06F 3/017* (2013.01);
(Continued)

(58) Field of Classification Search
CPC ........ G06F 3/011; G06F 3/0346; G06F 3/017; G06F 3/012; G02B 27/017;
(Continued)

(56) References Cited

U.S. PATENT DOCUMENTS 6,349,001 B1 * 2/2002 Spitzer ................. G02B 27/017
359/618
6,757,068 B2 * 6/2004 Foxlin .................. G02B 27/017
356/139.03
(Continued)

FOREIGN PATENT DOCUMENTS

WO 2015123771 A1 8/2015
WO 2018183390 A1 10/2018

OTHER PUBLICATIONS

International Search Report dated Jun. 21, 2018, for PCT/US2018/024658, filed Mar. 27, 2018, three pages.

*Primary Examiner* — Amy Onyekaba
(74) *Attorney, Agent, or Firm* — Morrison & Foerster LLP

(57) ABSTRACT

An augmented reality system includes left and right transparent eyepieces through which a user can view the real world and which serve to couple imagewise modulated light into the user's eyes in order to display virtual content components of a mixed reality experience. The system further includes left and right speakers and a facility for user spatial manipulation of virtual objects. The system produces spatialized audio that has a virtual sound source position fixed to one or more virtual objects that are spatially manipulated by the user. Thus the system provides more realistic visual and auditory presentation of virtual components of a mixed reality experience.

20 Claims, 14 Drawing Sheets

(51) Int. Cl.
  *H04R 5/033* (2006.01)
  *G06F 3/0346* (2013.01)
  *G02B 27/01* (2006.01)
  *H04S 1/00* (2006.01)
(52) U.S. Cl.
  CPC .......... *G06F 3/0346* (2013.01); *H04R 5/033* (2013.01); *H04S 7/304* (2013.01); *G02B 2027/0138* (2013.01); *G02B 2027/0187* (2013.01); *H04R 2499/15* (2013.01); *H04S 1/007* (2013.01); *H04S 7/303* (2013.01); *H04S 2400/11* (2013.01); *H04S 2400/15* (2013.01)
(58) Field of Classification Search
  CPC .... G02B 2027/0187; G02B 2027/0138; H04S 7/304; H04S 2400/15; H04S 7/303; H04S 1/007; H04S 2400/11; H04R 5/033; H04R 2499/15
  See application file for complete search history.

(56) References Cited

U.S. PATENT DOCUMENTS

| | | | | |
|---|---|---|---|---|
| 8,831,255 B2* | 9/2014 | Crawford | ............... | H04S 7/304 381/17 |
| 8,957,835 B2* | 2/2015 | Hoellwarth | ............. | G06F 3/041 345/8 |
| 9,182,594 B2* | 11/2015 | Hino | ............... | G02B 26/0816 |
| 9,557,566 B2* | 1/2017 | Fujimaki | ............... | G06F 3/011 |
| 9,630,105 B2* | 4/2017 | Stafford | ............... | A63F 13/213 |
| 9,774,979 B1* | 9/2017 | Morishita | ............... | H04R 5/033 |
| 9,897,805 B2* | 2/2018 | Stafford | ............. | G02B 27/0093 |
| 9,908,048 B2* | 3/2018 | Osman | ............... | A63F 13/213 |
| 9,987,554 B2* | 6/2018 | Stafford | ............... | A63F 13/213 |
| 10,019,057 B2* | 7/2018 | Osman | ............... | G02B 27/0172 |
| 10,031,576 B2* | 7/2018 | Cunningham | .......... | G10L 13/02 |
| 10,102,627 B2* | 10/2018 | Tsuda | ............... | G02B 27/0172 |
| 2005/0174470 A1* | 8/2005 | Yamasaki | ............ | G02B 27/017 348/345 |
| 2005/0195277 A1* | 9/2005 | Yamasaki | .......... | G02B 27/017 348/61 |
| 2005/0248852 A1* | 11/2005 | Yamasaki | .......... | G02B 27/0093 359/630 |
| 2008/0297437 A1* | 12/2008 | Takahashi | ............ | G02B 27/017 345/8 |
| 2009/0310802 A1 | 12/2009 | Zhang | | |
| 2010/0020229 A1* | 1/2010 | Hershey | ............... | H04N 5/2251 348/376 |
| 2010/0033427 A1* | 2/2010 | Marks | ............... | H04N 13/10 345/156 |
| 2010/0079356 A1* | 4/2010 | Hoellwarth | ............... | G06F 3/16 345/8 |
| 2011/0194029 A1* | 8/2011 | Herrmann | ............ | G02B 27/017 348/569 |
| 2011/0221656 A1* | 9/2011 | Haddick | ............. | G02B 27/017 345/8 |
| 2011/0231757 A1 | 9/2011 | Haddick | | |
| 2012/0242560 A1* | 9/2012 | Nakada | ................ | G09G 3/3406 345/8 |
| 2013/0083018 A1* | 4/2013 | Geisner | ................... | G06F 3/011 345/420 |
| 2013/0217488 A1* | 8/2013 | Comsa | ................... | G06F 17/00 463/31 |
| 2013/0236040 A1* | 9/2013 | Crawford | ............... | H04S 7/304 381/310 |
| 2013/0328762 A1* | 12/2013 | McCulloch | .......... | G02B 27/017 345/156 |
| 2013/0335573 A1* | 12/2013 | Forutanpour | ........... | G06F 3/011 348/158 |
| 2014/0006026 A1* | 1/2014 | Lamb | ...................... | G10L 17/00 704/246 |
| 2014/0362110 A1* | 12/2014 | Stafford | .................. | G06F 3/013 345/633 |
| 2015/0067580 A1* | 3/2015 | Um | ...................... | G06F 3/0481 715/781 |
| 2015/0138065 A1* | 5/2015 | Alfieri | ..................... | G06F 3/017 345/156 |
| 2015/0234501 A1* | 8/2015 | Lyons | ..................... | A63F 13/00 345/174 |
| 2015/0235426 A1* | 8/2015 | Lyons | .................. | G02B 27/022 345/8 |
| 2015/0301787 A1* | 10/2015 | Greco | ..................... | G06F 3/011 345/633 |
| 2015/0319530 A1 | 11/2015 | Virolainen | | |
| 2015/0348328 A1* | 12/2015 | Tsuda | ................. | G02B 27/0172 345/633 |
| 2015/0352437 A1* | 12/2015 | Koseki | .................. | A63F 13/25 463/31 |
| 2015/0379349 A1 | 12/2015 | Gomez | | |
| 2015/0382130 A1* | 12/2015 | Connor | .................... | H04S 7/304 381/303 |
| 2015/0382131 A1* | 12/2015 | Kuehne | .................... | H04S 7/304 381/310 |
| 2016/0026253 A1* | 1/2016 | Bradski | ............... | G02B 27/0172 345/8 |
| 2016/0085302 A1 | 3/2016 | Publicover | | |
| 2016/0093105 A1* | 3/2016 | Rimon | .................. | G06T 19/006 345/633 |
| 2016/0187970 A1* | 6/2016 | Ashforth | ............... | A63F 13/00 345/8 |
| 2016/0212272 A1* | 7/2016 | Srinivasan | ............ | H04M 3/567 |
| 2017/0039774 A1* | 2/2017 | Estable | ................ | G02B 27/017 |
| 2017/0076503 A1* | 3/2017 | Tamaoki | ................ | G06F 1/1694 |
| 2017/0354864 A1* | 12/2017 | Rogers | .................. | A63F 13/213 |
| 2017/0357334 A1* | 12/2017 | Balan | ..................... | H04N 13/204 |
| 2018/0003981 A1* | 1/2018 | Urey | ................... | G03H 1/2202 |
| 2018/0047202 A1* | 2/2018 | Long | ...................... | G06T 11/00 |
| 2018/0150131 A1* | 5/2018 | Ranieri | ................... | G06F 3/017 |
| 2019/0043238 A1* | 2/2019 | Benishti | ................ | H04N 13/383 |

\* cited by examiner

Prior Art

AUGMENTED REALITY SYSTEM WITH SPATIALIZED AUDIO TIED TO USER MANIPULATED VIRTUAL OBJECT

PRIORITY CLAIM

This application claims priority to U.S. Provisional Patent Application No. 62/477,976 filed Mar. 28, 2017.

FIELD OF THE INVENTION

The invention pertains to augmented reality systems.

BACKGROUND

Significant steps in the development of display technology include: the magic lantern, film based motion pictures, television, and modern digital video display technologies implemented in personal computers and mobile devices. Recently virtual reality headgear has been introduced. Such virtual reality headgear includes a pair of displays positioned close to and in front of the user's eyes and lenses intervening between the displays and the user's eyes to allow the user to focus on the displays. When using such virtual reality headgear the user is completely immersed in a virtual world and substantially cut off from the real world. Protracted use of virtual reality systems can induce "virtual reality sickness" which may be due to flaws in the realisticness of the sensation of the virtual environment. For example the sensory stimulus received via the vestibular system which is dependent on the user's dynamics in the real world may conflict with sensory stimulus of motion in the virtual world. It is believed that the human perception systems are highly attuned to integrating disparate, visual, auditory, touch, taste, smell and vestibular stimuli, and contradictory sensations causes sensory discord which can cause the human physiological systems to transition to a low functionally (virtual reality sickness) state that inhibits further engagement in the causative activity.

It would be desirable to provide a presentation of virtual content with achieves higher fidelity to the sensory perception that would be achieved if the virtual content were real.

SUMMARY

One aspect of the subject matter disclosed herein includes providing augmented reality system that includes headgear that includes a left eye display that includes a left transparent eyepiece and a right eye display that includes a right transparent eyepiece. The transparent eyepieces are used to couple images of virtual content into the user's field of view while simultaneously allowing the user see and be grounded (e.g., have a comfortable feeling of being oriented and balanced) in the real world. The headgear also includes a left speaker and a right speaker. The system also includes a handheld controller. A tracking subsystem that allows the relative translation offset and orientation of the handheld controller with respect to the headgear is also included in the system. The system also includes at least one processor coupled to the left eye display, the right eye display, the left speaker, the right speaker and the tracking system. The at least one processor could be included in the headgear, the handheld controller, and/or a separate unit. The at least one processor operates a system including, at least the headgear and the handheld controller. Left and right stereoscopic images of a first type virtual object are projected through, respectively, the left transparent eyepiece and the right transparent eyepieces. In certain cases the left and right displays may be configured to allow the curvature of the wave front of light reaching the user's eyes to be altered based on the distance to the virtual objects. The wave front curvature provided by the left and right displays may be quantized such that a limited number of values are available or may be continuously variable. The first type virtual object is maintained substantially fixed relative to the handheld controller. Because the virtual object is fixed to the handheld controller, by moving the handheld controller the user can move the first type virtual object and see the first type virtual object move relative to the real world through the transparent eyepieces. The first type virtual object emits a sound. The sound is emitted from a point in space occupied by the virtual object. The point in space from which the sound is emitted moves along with the virtual object under the control of the user through the facility of the handheld controller. As the point in space is moved an appropriate Head Related Transfer Function (HRTF) for the coordinates of the point in space relative to the user's head is used to process the sound emitted by the object and the stereo output of the HRTF is output through the left and right speakers. In this manner the user hears a sound that is substantially realistically spatialized so as to sound as though emanating from the position to which the user has moved the virtual object.

In an alternative to the above described aspect, the handheld controller is not used. Rather, a machine vision subsystem (of the augmented reality system) including a camera tracks a user's hand and the spatialized sound emitting virtual object is, at least temporarily, fixed to the user's hand. The augmented reality system can also be configured to recognize certain gestures (e.g., a throwing motion) that direct that the virtual object be decoupled from the user's hand. After such decoupling the spatialized audio will continue to be emitted from the moving position of the virtual object.

An additional aspect of the subject matter disclosed herein involves a second type virtual object the motion of which is defined in an inertial motion fixed to a real world environment in which a user of the augmented reality system is situated. A spatialized sound for the second type virtual object has a virtual source point that is occupied by the second type of virtual object. The second type virtual object may for example obey Newton's laws of motion with some imposed preprogrammed mass. For special applications, in addition to the mass, an electric charge or magnetic dipole moment may also be assigned to the object so that it can be made to properly interact with additional real or virtual objects that have an electric charge or magnetic dipole moment. The user can interact with the second type virtual object using his or her hands via the agency of hand gesture recognition implemented in the system. For example the user could push or take hold of the second virtual object with a prearranged hand gesture that the system is programmed to recognize. By pushing the second type virtual object the user can impart a velocity to the second virtual object which will then continue in accordance with Newton's laws and may subsequently be subject to further manipulation by the user and/or interact with other virtual objects or real objects. For example the virtual object can be virtual ball and the user may be playing a game of handball using the virtual ball and a real wall. The real wall may be part of a mixed reality object that also includes a virtual representation of the wall. The virtual ball may emit a "whoosh" sound that corresponds the sound of an object moving at high speed through the air. The whoosh sound is spatialized and has a virtual sound source that is occupied by the virtual ball. A second spatialized bounce sound with a virtual source position occupied by the virtual ball may be emitted when the virtual ball bounces off of an augmented reality wall that includes a real wall component and its associated virtual wall representation component. While the second type virtual object is in motion, in order to maintain its motion (e.g., per Newton's $1^{st}$ law) relative an inertial reference frame fixed to the environment of the user, even in the case that the user rotates his/her head along with the headgear, the motion of the user's head must be tracked and an alteration of the images of the second type virtual object displayed through the eyepieces must be performed in order to compensate for the motion of the user's head. The nature of the alteration bears further explanation. The images are altered to maintain coordinates of the second type virtual object as defined in the inertial reference frame tied to the local environment (including any intended motion within the inertial reference frame) unaffected by the rotation of the headgear along with the user's head.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
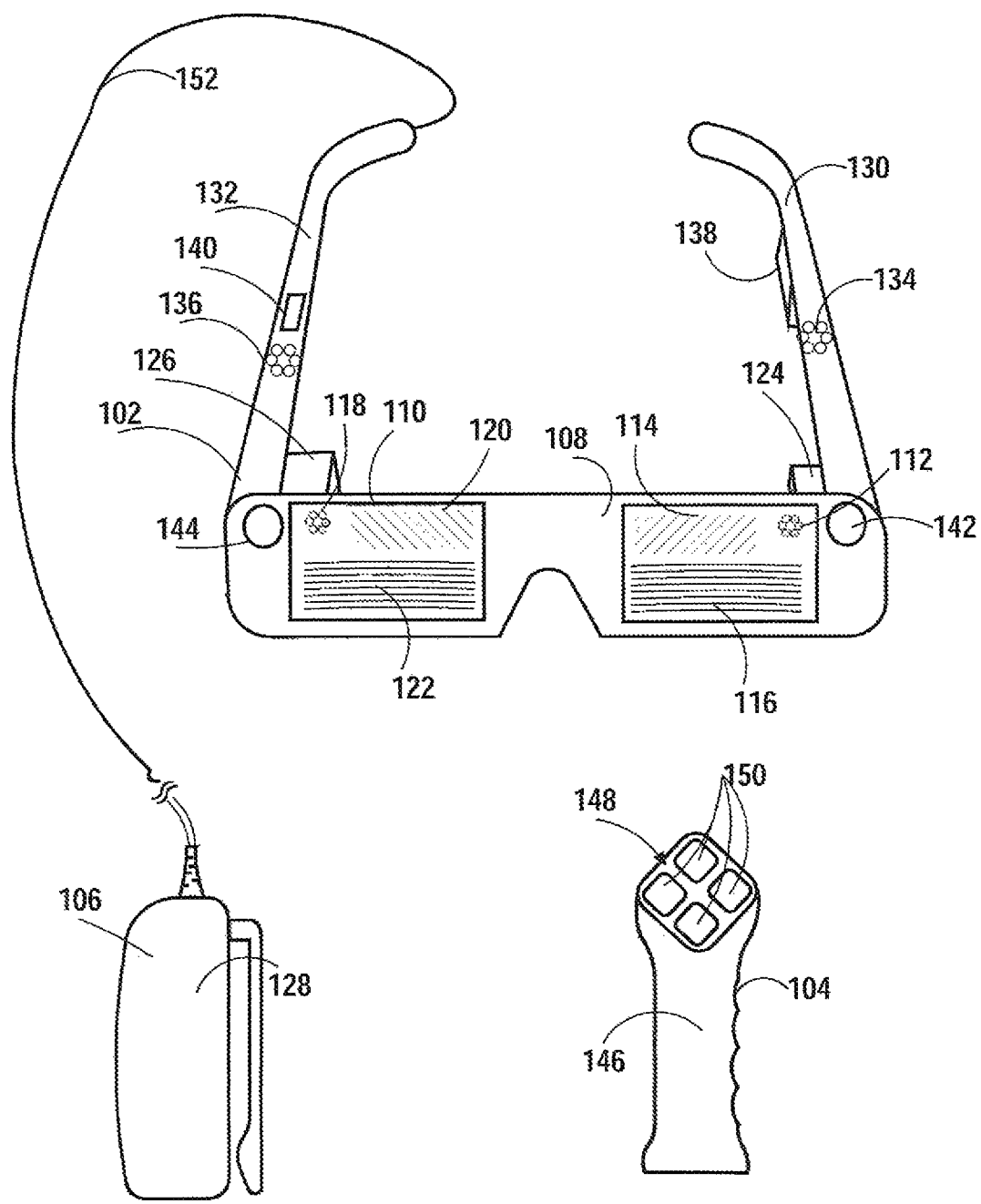
FIG. 1 shows an augmented reality system according to an embodiment of the invention.

FIG. 1 shows an augmented reality system 100 according to an embodiment of the invention. As shown in FIG. 1, the system 100 includes augmented reality headgear 102, a handheld controller 104, and an auxiliary unit 106. The augmented reality headgear 102 includes a left (user's left) transparent waveguide set eyepiece (herein below "left eyepiece") 108 and a right transparent waveguide set eyepiece (herein below "right eyepiece") 110. Each eyepiece 108, 110 includes surface diffractive optical elements for controlling the flow of imagewise modulated light. In particular, the left eyepiece 108 includes a left incoupling grating set 112 (a first of which is visible in FIG. 1 and FIG. 3), a left orthogonal pupil expansion (OPE) grating set 114 (a first of which is visible in FIG. 1 and FIG. 3) and a left exit (output) pupil expansion (EPE) grating set 116 (a first of which is visible in FIG. 1 and FIG. 3). Similarly the right eyepiece 110 includes a right incoupling grating set 118, a right OPE grating set 120 and a right EPE grating set 122. Imagewise modulated light is transferred via the incoupling gratings 112, 118, OPEs 114, 120 and EPE 116, 122 to a user's eye. Alternatively, in lieu of the incoupling grating sets 112, 118, OPE grating sets 114, 120 and EPE grating sets 116, 122 the eyepieces 108, 110 include refractive and reflective features for controlling the coupling of imagewise modulated light to the user's eyes.

A left source of imagewise modulated light 124 is optically coupled into the left eyepiece 108 through the left incoupling grating set 112 and a right source of imagewise modulated light 126 is optically coupled into the right eyepiece 110 through the right incoupling grating set 118. The sources of imagewise modulated light 124, 126 can, for example, take the form of optical fiber scanners, projectors including electronic light modulators such as, for example, Digital Light Processing (DLP) chips, or Liquid Crystal on Silicon (LCoS) modulators, or emissive displays, such as for example, micro Light Emitting Diode (μLED) or micro Organic Light Emitting Diode (μOLED) panels coupled into the incoupling grating sets 112, 118 using one or more lenses per side. The input coupling grating sets 112, 118 deflect light from the sources of imagewise modulated light 124, 126 to angles above the critical angle for Total Internal Reflection (TIR) for the eyepieces 108, 110. The OPE grating sets 114, 120 incrementally deflect light propagating by TIR down toward the EPE grating sets 116, 122. The EPE grating sets 116, 122 incrementally couple light out toward the user's face including the user's eyes' pupils. The left eyepiece 108 in combination with the left source of imagewise modulated light 124 constitutes a left display and the right eyepiece 110 in combination with the right source of imagewise modulated light 126 constitutes a right display.

The auxiliary unit 106 can include a battery (526, FIG. 5) to provide energy to operate the system 100, and can include a processor (516, FIG. 5) for executing programs to operate the system 100. As shown the auxiliary unit 106 includes a clip 128 that is useful for attaching the auxiliary unit 106 to a user's belt. Alternatively the auxiliary unit 106 can have a different form factor.

The augmented reality headgear 102 also includes a left temple arm 130 and a right temple arm 132. The left temple arm 130 includes a left temple speaker port 134 and the right temple arm 132 includes a right temple speaker port 136. An orthogonal coil electromagnetic receiver 138 is accommodated in the left temple piece although it could be located elsewhere in the headgear 102. An Inertial Measurement Unit (IMU) 140 is accommodated in the right temple arm 132 although it could be located elsewhere in the headgear 102. The headgear 102 also includes a left depth (e.g., time-of-flight) camera 142 and a right depth camera 144. The depth cameras 142, 144 are suitably oriented in different directions so as to together cover a wider field of view.

The handheld controller 104 includes a grip portion 146 and a top 148 that includes a plurality of buttons 150. The buttons 150 may also be used as an optical tracking target for tracking six degrees of freedom (3 degrees of translation and 3 degrees of rotation) of motion handheld controller 104. Additionally, as discussed further below the handheld controller 104 can include additional components for tracking six degrees of motion of the handheld controller 104 relative to the headgear 102. The auxiliary unit 106 is coupled to the headgear 102 through a multiconduit cable 152 which can, for example, include electrical wires and fiber optics. Wireless connections between the auxiliary unit 106 and the headgear 102 can also be used.

Figure 2:
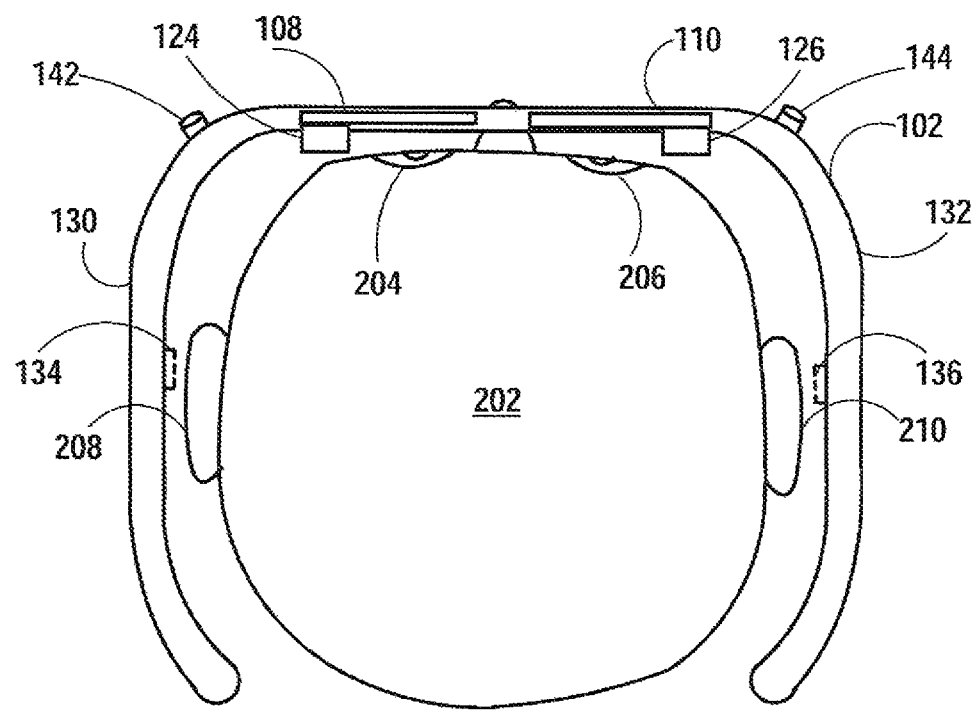
FIG. 2 is a top view of wearable headgear of the system shown in FIG. 1 positioned on a user's head.
Figure 3:
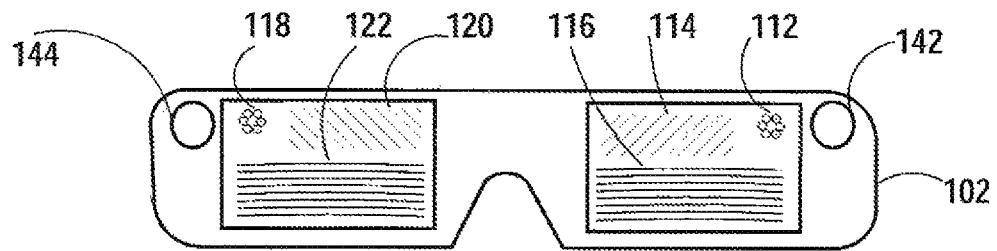
FIG. 3 is a front view of the wearable headgear shown in FIGS. 2-3.

FIG. 2 is a top view of wearable headgear 102 of the system 100 shown in FIG. 1 positioned on a user's head 202. The user's left eye 204 is positioned to look through the left eyepiece 108 and the user's right eye 206 is positioned to look through the right eyepiece 110. The left speaker port 134 is positioned next to the user's left ear 208 and the right speaker port 136 is positioned next to the user's right ear 210. FIG. 3 is a front view of the wearable headgear shown in FIGS. 2-3.

Figure 4:
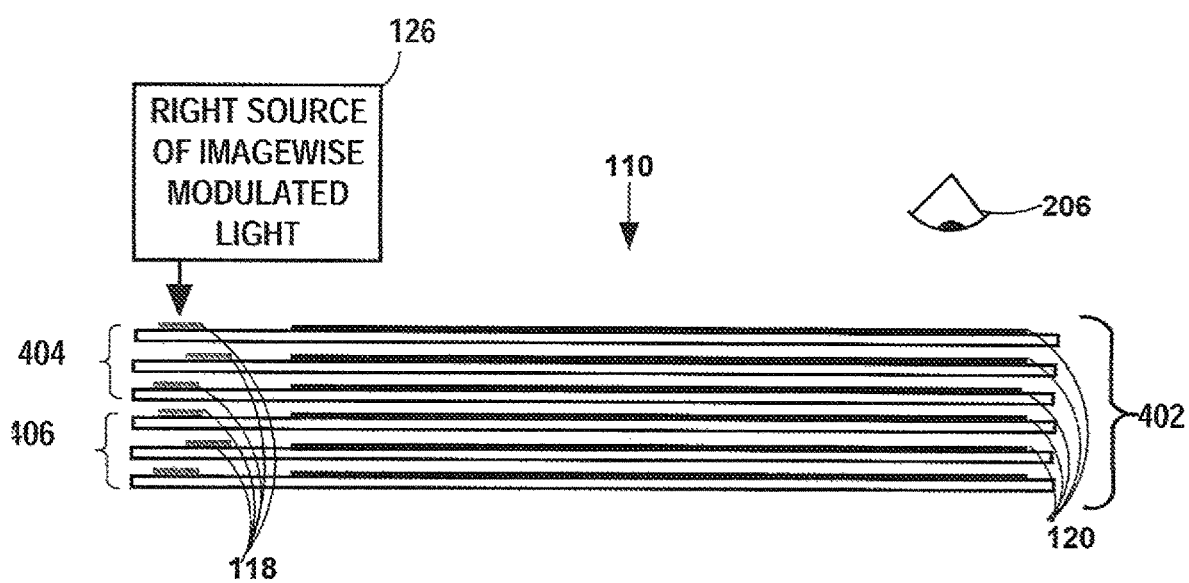
FIG. 4 is an edge on view from the top of a right eyepiece and a schematic representation of a right source imagewise modulated light of the augmented reality headgear shown in FIGS. 1-3.

According to certain embodiments each of the left eyepiece 108 and the right eyepiece 110 includes a stack of multiple waveguides 402 (FIG. 4). For example each eyepiece 108, 110 can individual waveguides dedicated to each of multiple (e.g., red, blue and green) color channels. Additionally each eyepiece 108, 110 can include multiple sets of waveguides, with each set including individual waveguides for handling different (e.g., red, blue and green) color channels with the sets being differentiated by being configured to impart different wave front curvature to emitted light. The wave front curvature would typically be diverging (convex) toward the user's eyes so as to correspond to a virtual object position spaced in front of the user by a distance corresponding to the reciprocal of wave front curvature. As shown in FIG. 1 and FIG. 3 the EPE gratings in the EPE grating set 122 include curved grating grooves. The curved grating grooves serve to impart the above described wave front curvature by altering the Poynting vector of exiting light across each EPE.

Stereoscopically adjusted left and right eye imagery is output to the user through the imagewise light modulators 124, 126 and the eyepieces 108, 110 in order to contribute to the perception that displayed content is three dimensional. Selecting a waveguide through which to output imagery to best match the wave front curvature with which a virtual object is displayed to match the distance indicated by the stereoscopic left and right images aids in increasing the realisticness of the three dimensional imagery and helps to avoid a sensory conflict between the depth perception cues due the difference between the left and right eye imagery and the autonomic accommodation (object distance dependent focus) of the human eye. While not wishing to be bound to any particular theory of operation of the augmented reality system 100, it is believe that such sensory conflicts as they exist in prior virtual and augmented reality system may be one source of virtual reality sickness.

FIG. 4 is an edge on view from the top of the right eyepiece 110 and a schematic representation of the right source imagewise modulated light 126 of the augmented reality headgear 102 shown in FIGS. 1-3. Although not shown the structure of the left eyepiece 108 is a mirror image of the structure of the right eyepiece 110. As shown in FIG. 4 the stack of waveguides 402 includes a first subset of three waveguides 404 and a second subset of three waveguides 406. The two subsets of waveguides 404, 406 are differentiated by having different EPE gratings (not shown in FIG. 4) which have different grating line curvatures to impart different wave front curvature to exiting light. Within each of the subsets of waveguides 404, 406 each waveguide can be used to couple a different spectral channel (e.g., one of red, green and blue spectral channels) to the user's right eye 206.

Figure 5:
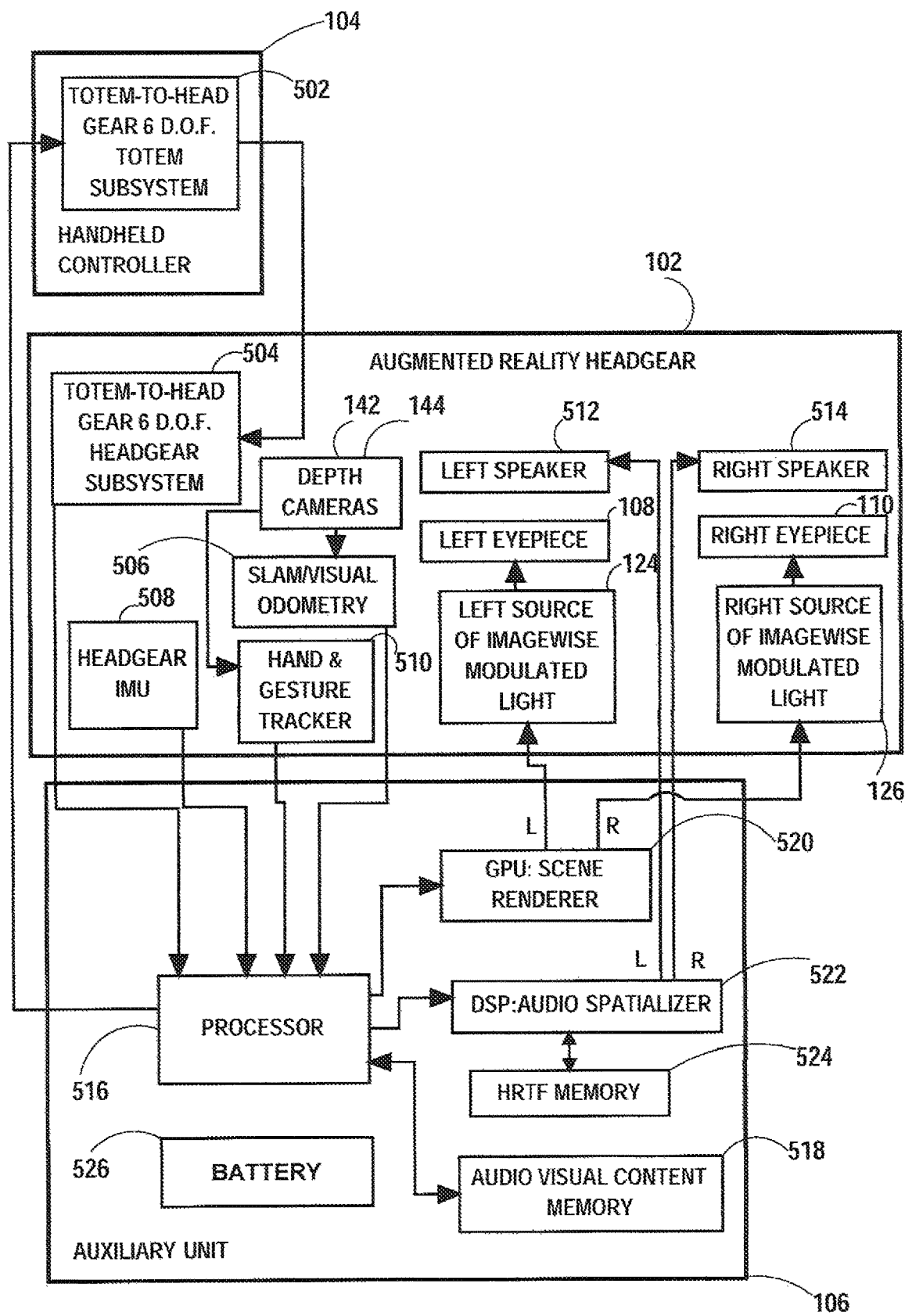
FIG. 5 is a block diagram of the system shown in FIGS. 1-3 according to an embodiment in the invention.

FIG. 5 is a block diagram of the system 100 shown in FIGS. 1-3 according to an embodiment in the invention. As shown in FIG. 5 the handheld controller 104 (also known as a "totem") includes a totem-to-headgear six degree of freedom (6 DOF) totem subsystem 502 and the augmented reality headgear 102 includes a totem-to-headgear 6 DOF headgear subsystem 504. The 6 DOF totem subsystem 502 and the 6 DOF headgear subsystem 504 cooperate to determine six coordinates of the handheld controller 104 relative to the augmented reality headgear 102. The six coordinates include three translation offsets and three degrees of freedom for rotation (orientation) coordinates. The six degrees of freedom may be expressed relative to a coordinate system fixed to the headgear 102. The three translation offsets may be expressed as X, Y, and Z offsets in such a coordinate system. And the rotation degrees of freedom may be expressed as sequence of yaw, pitch and roll rotations or as a Quaternion orientation. According to one approach the 6 DOF headgear system 504, the depth cameras 142, 144 (alternatively non-depth camera(s)) included in the headgear 102 and an optical target, e.g., in the form of buttons 150 as described above, or in the form of dedicated indicia included in the handheld controller 104 are used for 6 DOF tracking. Alternatively the handheld controller 104 can include a camera and the headgear 102 can include an optical target that together are used for optical tracking. According to another approach which is discussed more fully below the headgear 102 and the handheld controller 104 each include a set of three orthogonally oriented solenoids which are used to wirelessly send and receive signals. By measuring the relative magnitude of the signals received in each of the coils used for receiving, the 6 DOF of the handheld controller 104 relative to the augmented reality headgear 102 may be determined. Various techniques for determining the relative position and orientation between two sets of three orthogonal coils are known in the art of motion tracking and may be used to track the relative position and orientation of the hand controller 104 with respect to the headgear 102. (Additionally, 6 DOF totem subsystem 502 can include an Inertial Measurement Unit (IMU) that is useful to provide improved accuracy and/or more timely information on rapid movements of the handheld controller 104.

In order more fully realize the illusion of virtual content in the augmented reality system 100 it is useful that the motion or stationary status of each virtual object be defined in an inertial reference frame fixed to the user's environment notwithstanding the fact that the user along with the augmented reality headgear 102 that is generating the virtual content may be ambulating and pivoting their head. For example, if a virtual person is seated on a real chair in front of the user, the virtual person should remain seated when the user rotates their head 10° to the left, and not suddenly be shifted out of the chair into space adjacent to the chair. Similarly if a virtual person is walking at a steady pace across a real room the virtual person's steady walk should be maintained notwithstanding the user walking toward the virtual person (unless the virtual person is specifically programmed to react in a different manner). To maintain virtual objects motion as defined relative to the environment fixed inertial reference frame the augmented reality headgear tracks the user's head orientation (termed "head pose") and position with respect to the local environment (e.g., position within a room in which the user is located). The user's head pose and position can be determined processing imagery from the depth cameras 142, 144 using a Simultaneous Localization and Mapping (SLAM) and visual odometry procedure. As shown in FIG. 5 the depth cameras 142, 144 are coupled to a SLAM/visual odometry block 506. The SLAM/visual odometry block 506 implementation can, for example, include a programmed processor which is a form of electronic circuitry. An additional source of information on the user's head pose and location is obtained from a headgear Inertial Measurement Unit (IMU) 508. Information from the IMU 508 can be integrated with information from the SLAM/visual odometry block 506 to provide improved accuracy and/or more timely information on rapid adjustments of the user's head pose and position.

Coordinates of the handheld controller 104 as determined by the 6 DOF totem subsystem 502 and the 6 DOF headgear subsystem 504 can be transformed to a coordinate system fixed to the user's environment which is also used as a coordinate system for defining the 6 DOF of virtual content.

The depth cameras 142, 144 are also coupled to and supply 3D imagery to a hand gesture tracker 510. The hand gesture tracker 510 is configured to match 3D imagery received from the depth cameras 142, 144 to stored patterns representing for each of multiple hand gestures that are recognizable by the hand gesture tracker 510.

The headgear 102 also includes a left speaker 512 that is acoustically coupled to the user's left ear 208 through the left speaker port 134 and a right speaker 514 that is acoustically coupled to the user's right ear 206 through the right speaker port 136 when the headgear 102 is in use.

The auxiliary unit 106 includes a processor 516 (or alternatively multiple processors) that is coupled to and receives data from the headgear's 6 DOF headgear subsystem 504, the IMU 508, the SLAM/visual odometry block 506, and the hand gesture tracker 510. The processor 516 can take the form of electronic circuitry. The processor 516 is also coupled to and can send control signals to the 6 DOF totem system 502. The processor 516 may be coupled to the 6 DOF totem system wirelessly, as the handheld controller 104 may be untethered. The processor 516 can receive 6 DOF information regarding the relative orientation of the handheld controller 104 to the headgear 102 from the 6 DOF totem subsystem 502 or the 6 DOF headgear subsystem 504.

Within the auxiliary unit 106 the processor 516 is coupled to an audio visual content memory 518, a Graphical Processing Unit (GPU) scene render 520 and a Digital Signal Processor (DSP) audio spatializer 522. The audio visual content memory 518, the Graphical Processing Unit (GPU) scene render 520 and the Digital Signal Processor (DSP) audio spatializer 522 may take the form of electronic circuitry. The DSP audio spatializer 522 is coupled to a Head Related Transfer Function (HRTF) memory 524. The GPU scene renderer 520 includes a left channel output coupled to the left source of imagewise modulated light 124 and a right channel output coupled to the right source of imagewise modulated light 126. GPU scene renderer 520 outputs stereoscopic image data to the sources of imagewise modulated light 124, 126. The DSP audio spatializer 522 is coupled to and outputs left and right channel audio to, respectively, the left speaker 512 and the right speaker 514. The audio spatializer 522 is responsive to information received from the processor 516 as to the direction from the user of the system 100 to sound emitting virtual content, the movement of which is being controlled by the user via the handheld controller 104 or with the user's hand. Based on the direction to the above mentioned virtual content, the audio spatializer 522 accesses one or more HRTF with a corresponding or close direction. By way of example, a set of virtual speakers, each having defined spherical angular coordinates with respect to the headgear 102 can be defined and Vector Based Amplitude Panning (VPAB) can be used to determine apply a weighting coefficient for each of multiple copies of an audio stream associated with the sound emitting virtual content that are then associated with a subset of the set of virtual speakers. To the extent that each of the set of virtual speakers has certain spherical angular coordinates, each is properly associated with predetermined left and right HRTFs. The audio spatializer 522 applies the accessed or generated HRTF(s) to an audio component of the virtual content in order to improve the realisticness of the virtual content.

The auxiliary unit 106 also includes a battery 526 to power its components and also to supply power to the augmented reality headgear 102.

Figure 6:
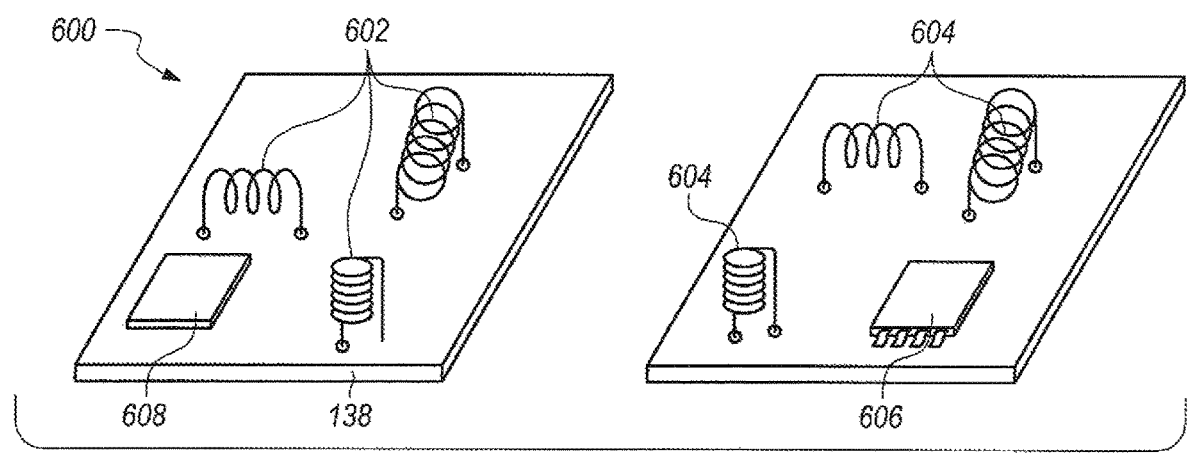
FIG. 6 shows certain components of an electromagnetic tracking system including a receive side set of three orthogonal solenoids along with a transmit side set of three orthogonal solenoids that can be used for tracking relative coordinates in the systems shown in FIGS. 1-5 according to an embodiment of the invention.

FIG. 6 shows certain components an electromagnetic tracking system 600 including a receive side set of three orthogonal solenoids 602 along with a transmit side set of three orthogonal solenoids 604 that can be used for tracking relative coordinates in the systems shown in FIGS. 1-5 according to an embodiment of the invention. By way of example the transmit side set of three orthogonal solenoids 604 can be included in the 6 DOF totem subsystem 502 and the receive side set of three orthogonal solenoids 602 can be included in the 6 DOF headgear subsystem 504. The transmit side set of three orthogonal solenoids 604 is coupled to a transmitter 606 that drives each of the transmit side set of three orthogonal solenoids 604 with a distinguishable (e.g., distinct frequency, or distinct modulation for example) signal. The receive set of three orthogonal solenoids 602 are coupled to a receiver 608. The receiver is configured to detect the amplitude of each of the aforementioned distinguishable signals received by each of the receive side set of three orthogonal coils 602. The mutual coupling between the receive solenoids 602 and the transmit solenoids 604 is given by electromagnetic theory. Based on the amplitudes the relative displacement and orientation offsets between the transmit side orthogonal solenoids 604 and the receive side set of orthogonal solenoids 602 is determined by the processor 516.

Figure 7:
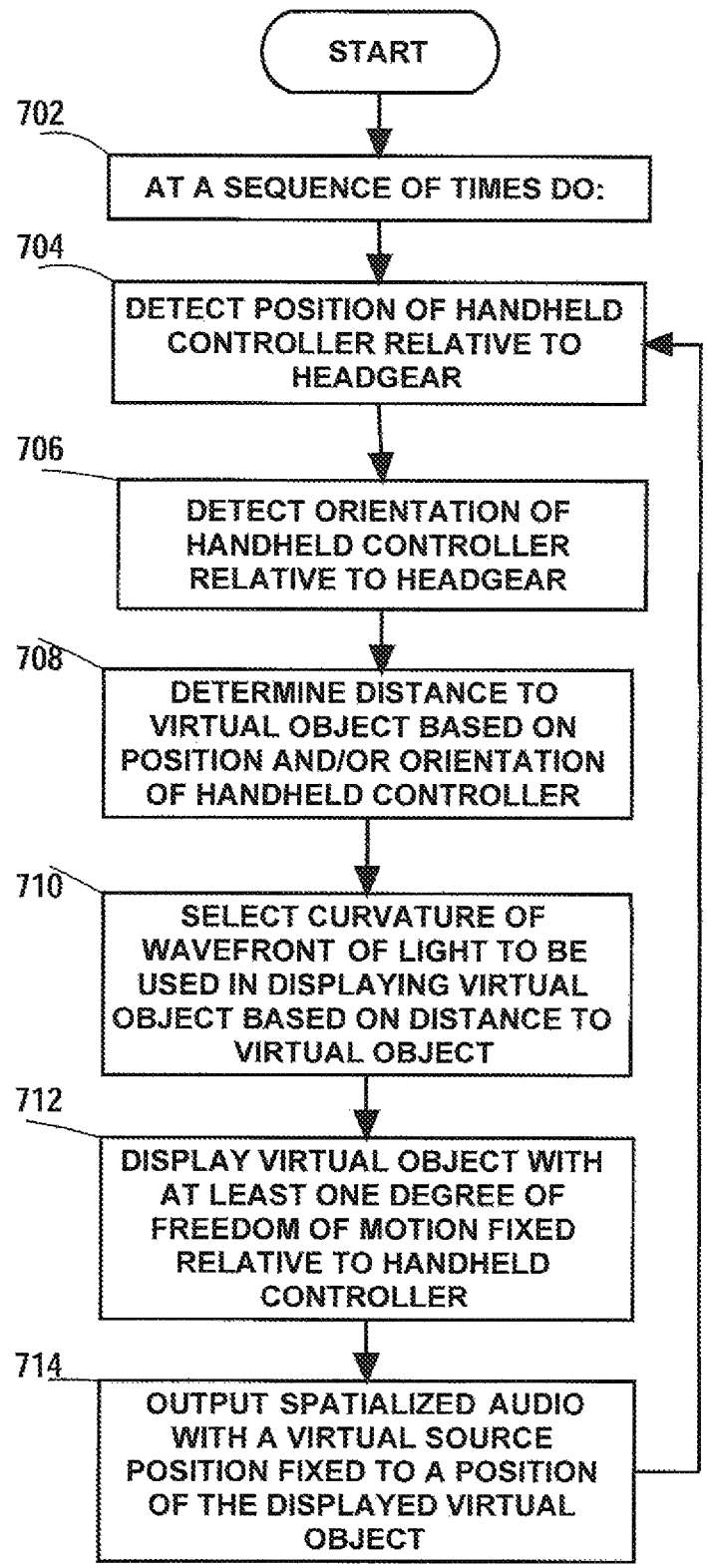
FIG. 7 is a flowchart of a method of operating the system shown in FIGS. 1-6 according to embodiments of the invention.

FIG. 7 is a flowchart of a method 700 of operating the system 100 shown in FIGS. 1-6 according to embodiments of the invention. Block 702 represents the top of a loop that is repeated for a sequence of times. The sequence of times here and in the case of other embodiments may or may not be at regular intervals. For example, parts of the method 700 may be triggered by external events. In block 704 a current position of the handheld controller 104 relative to the headgear 102 is detected. In block 706 a current orientation of the handheld controller 104 relative to the headgear 102 is detected. Blocks 704 and 706 can, for example, be performed using the totem 6 DOF subsystem 502 and the headgear 6 DOF subsystem 504.

In block 708 the distance of a virtual object which will be (in the case of initialization) or is currently being displayed from the headgear 102 is determined. The displacement vector and relative orientation between the headgear 102 and the handheld controller 104 can be determined using the totem 6 DOF subsystem 502 and the headgear 6 DOF subsystem 504; and the displacement and relative orientation between the handheld controller 104 and the virtual object is determined by the system 100, such that the distance between the virtual object and the headgear 102 can be determined by evaluating a displacement vector sum. In block 710 the curvature of the wave front of light with which the virtual object is to be displayed is selected to best match the distance to the virtual object as determined in block 708. As discussed above with reference to FIG. 4 each of multiples subsets of waveguides 404, 406 of the eyepieces 108, 110 can have an EPE 116, 120 with a different curvature of grating grooves in order to impart a different divergent wave front curvature to light emitted from the eyepieces for displaying images of virtual objects to the user. Matching or approximating the correct wave front curvature to the distance of virtual objects helps to enhance the realisticness of virtual content and is believed to contribute to avoiding virtual reality sickness.

In block 712 a virtual object is displayed via the sources of imagewise modulated light 124, 126 and the eyepieces 108, 110 with at least one rotational or positional degree of freedom substantially fixed to at least one position and/or rotation coordinate (as determined in blocks 704, 706) of the handheld controller 104 and optionally but beneficially with light having a wave front curvature as determined in block 710. In certain cases all of the translation degrees of freedom of the virtual object relative to the handheld controller 104 are substantially fixed. System latency may lead to some lag in the movement of the virtual object to track to handheld controller 104. In certain embodiments an intentional elasticity (e.g. according to a certain force law with dampening) may be provided between the position of the handheld controller 104 and the virtual object. It is useful to think of a virtual Cartesian coordinate system locked to the handheld controller 104 with the virtual object, in certain cases having fixed X, Y and Z coordinates in the Cartesian coordinate system. The virtual object may for example comprise a blade of a laser sword, or a magic wand, a rattle, or any number of other things. In certain embodiments the virtual object may be substantially fixed in the coordinate system fixed to the handheld controller 104 but displaced from the handheld controller by some vector defined in the coordinate system fixed to the handheld controller 104. The laser sword is then being implemented as a mixed reality object with the handheld controller 104, serving as the handle of the sword, being a real component of the mixed reality object, and the blade of the sword being a virtual component of the mixed reality object. In block 714 spatialized audio is output through left and right speakers 512, 514 and the left and right speaker ports 134, 136. The spatialized audio that is output in block 714 has a virtual source position that is fixed to a position of the virtual object that is displayed in block 712 with at least one coordinate fixed to the handheld controller 104.

Figure 16:
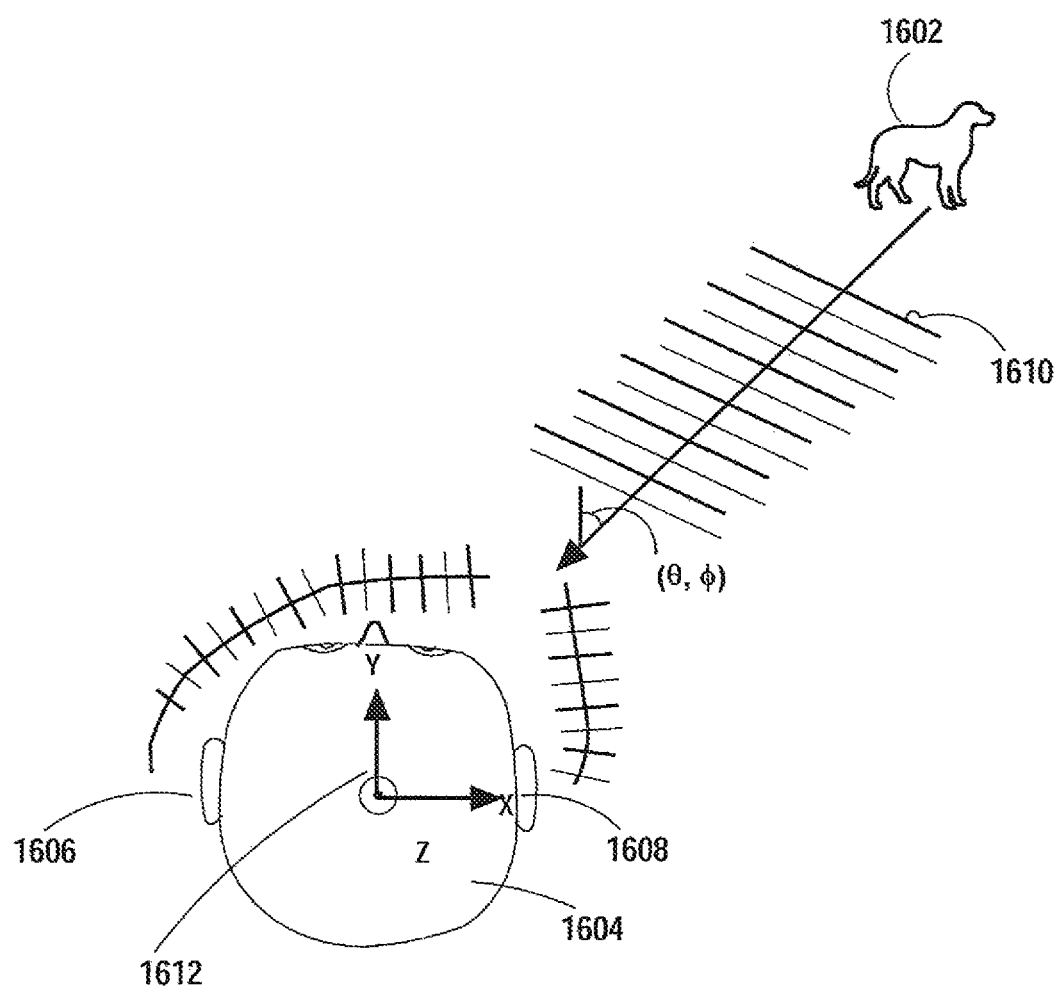
FIG. 16 schematically represents coupling of an environmental sound to a person's two ears.

A brief explanation of spatialized audio is in order. Referring to FIG. 16, when sound is emitted by a real sound source 1602, due to interaural time delay (difference between when the sound reaches a person's left ear 1606 and right ear 1608), interaural phase delay, and difference in the frequency response of the ears as a function of the angle-of-arrival of the sound waves 1610, a person can detect with some degree of accuracy the direction from which a sound arrived. The angle-of-arrival can be measured with respect to a coordinate system 1612 defined with respect to a person's head 1604. For example a polar angle can be measured with respect to a vertical Z axis, and an azimuth angle can be measured with respect to an X axis passing through the left and right ears. The difference of sound signals reaching a person's two ears can be measured or simulated and stored as Head Related Transfer Function (HRTF). The Head Related Transfer Function (HRTF) can be represented and applied to signals in the frequency domain or the time domain. The HRTF includes a left ear HRTF component and a right ear HRTF component. The HRTF includes frequency responses for each of many angles of arrival and each of multiple distances. For example, HRTFs may be stored for each elevation angle spaced in 5° increments and each azimuth angle spaced in 5° increments and each of set of distances (for example 10 cm, 40 cm, 1 m, 2 m 3 m and 6 m). For angles and distances between those for which the HRTF has been measured and stored, VPAB or interpolation may be used, or the nearest angle and distance for which HRTF information is available may be substituted. A mono (single channel) audio recording (or synthesized sound) may be passed through the left and right parts of the HRTF for a particular angle and played back through the left speaker 512 and the right speaker 514 in order simulate origination of the sound at particular spherical coordinates (angle and distance) relative to the user's head. Applying an HRTF that is selected based on the coordinates of the virtual object serves to enhance the realisticness of the virtual objects in the augmented reality world generated by the system 100. Because the headgear 102 is fixed to the user's head the correct HRTF in terms of angular coordinates and distance is based on the relative coordinates between the displayed virtual object and the headgear 102 which can be deduced based on the detection of the positional and angular offsets between the headgear 102 and the handheld controller 104 as determined in blocks 704, 706 and a coordinate offset between the virtual object and the handheld controller 104 that is imposed in block 712.

In one implementation a set of virtual speaker position can be defined with respect to the headgear 102. The angular coordinates of the virtual speaker positions can be defined in terms of azimuth and polar angle in a spherical coordinate system that is centered midway between the ears of a person wearing the headgear 102. The virtual speakers can be distributed evenly or unevenly in the 4 $\pi$ solid angle space. For example more speakers may be placed closer to the horizontal plane bisecting the solid angle space (i.e., closer to the equatorial region). By way of nonlimitive example, the number of virtual speakers may be in the range of 15 to 30. To the extent that the angular coordinates of each particular virtual speaker are fixed, each virtual speaker can be associated with a set of left and right HRTF's that are selected for the particular virtual speaker based on its angular coordinates. To the extent that the angular coordinates of virtual sound sources may be freely varied under user control, the angular coordinates of a virtual sound source will generally not exactly match the angular coordinates of any of the set of virtual speakers. However Vector Based Amplitude Panning (VBAP), may be used to effectively interpolate between the angular coordinates of available virtual speaker by selecting a subset (e.g., 3 or 4) of the virtual speakers which define an angular subregion that includes the angular coordinates of the virtual speaker and apportioning amplitude to the each of the subset based on the proximity of the angular coordinates of the virtual sound source to the angular coordinates of the subset of virtual speakers. The left and right HRTF associated with each of the subset of virtual speakers can then be applied to amplitude scaled versions of the virtual sound source audio stream and the output of left and right HRTFs can be separately summed over the subset before being applied the left 512 and right 514 speakers of the headgear 102.

Additionally in enclosed spaces sound may be bounced off of surfaces (e.g., walls, floors, ceilings, table tops) and reflected sound may reach the user in addition to sound that reaches the user directly without reflection. The reflected sound contributes to the acoustic ambience of the space. As described further below with reference to FIG. 9, real world surfaces (e.g., walls, ceilings) that would reflect real sounds can be identified by the system 100 and virtual sounds which are output at relatively low volume through the left and right speaker ports 134, 136 and hence would not produce significant reflections, can be synthetically altered to include such reflections as though such sounds emitted by virtual objects were emitted by real analogs present in the space in which the system 100 is being used.

Figure 8:
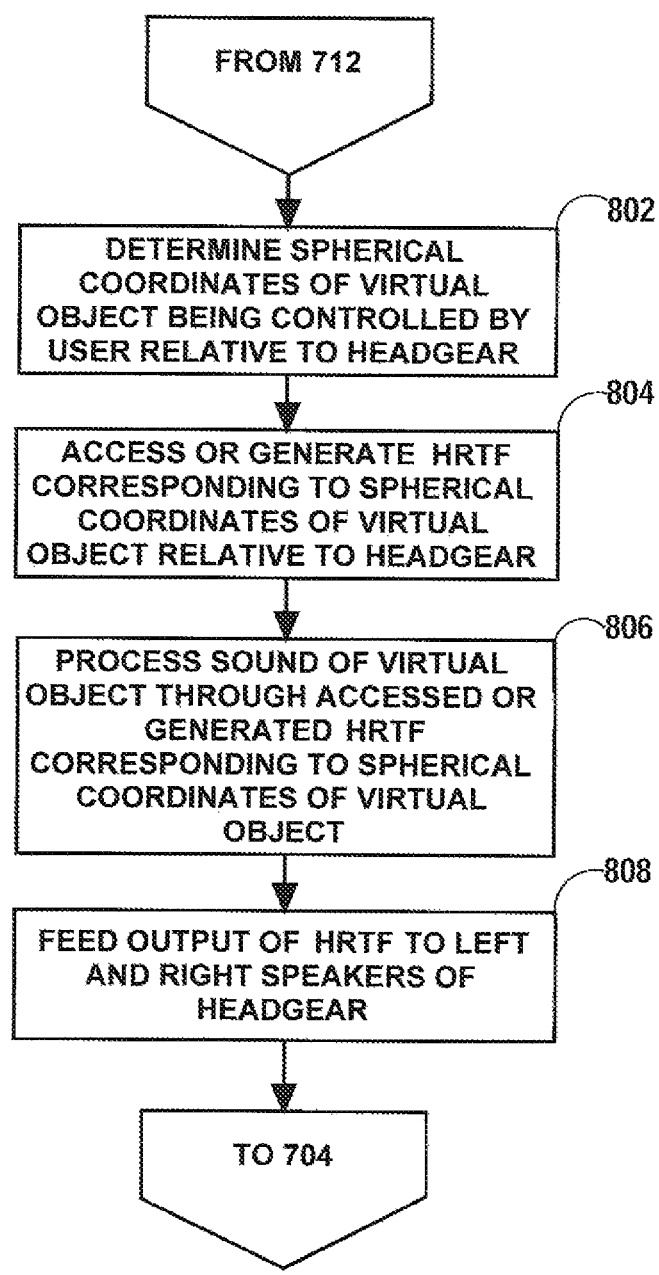
FIG. 8 is a flowchart of a method of generating spatialized audio that may be used in the method shown in FIG. 7 and FIG. 14.
Figure 14:
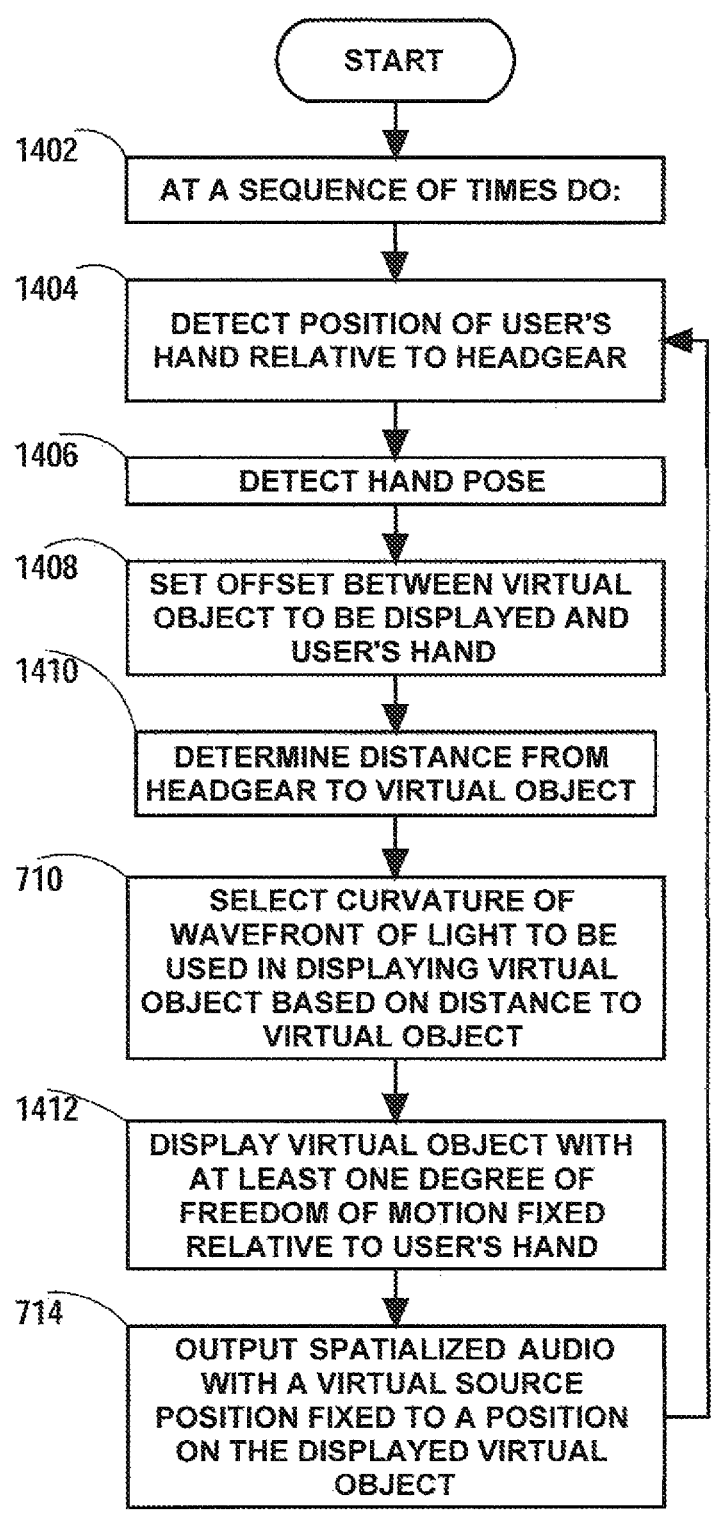
FIG. 14 is a flowchart of a method of operating an augmented reality system according to another embodiment of the invention.

FIG. 8 is a flowchart of a method 800 of generating spatialized audio that may be used in the method shown in FIG. 7 and FIG. 14. The method 800 can be used to implement block 714 of the method 800 shown in FIG. 8. An initial block 802 of the method 800 follows block 712 of the method 700. In block 802 the spherical coordinates of a virtual object being controlled by the user (via the handheld controller or with the user's hand) with respect to the headgear 102 are determined. Note that the headgear 102 being worn by a user is substantially fixed to the user's head. In block at least one HRTF corresponding to the spherical coordinates of the virtual object is obtained by accessing stored HRTF information. In block sound of the virtual object being controlled by the user is processed through the HRTF(s) obtained in block 804. In block 808 audio processed by the HRTF in block 806 is fed to the left and right speakers 512, 514 output to the user through the left and right speaker ports 134, 136. Block 704 of the method 700 follows block 808.

Figure 9:
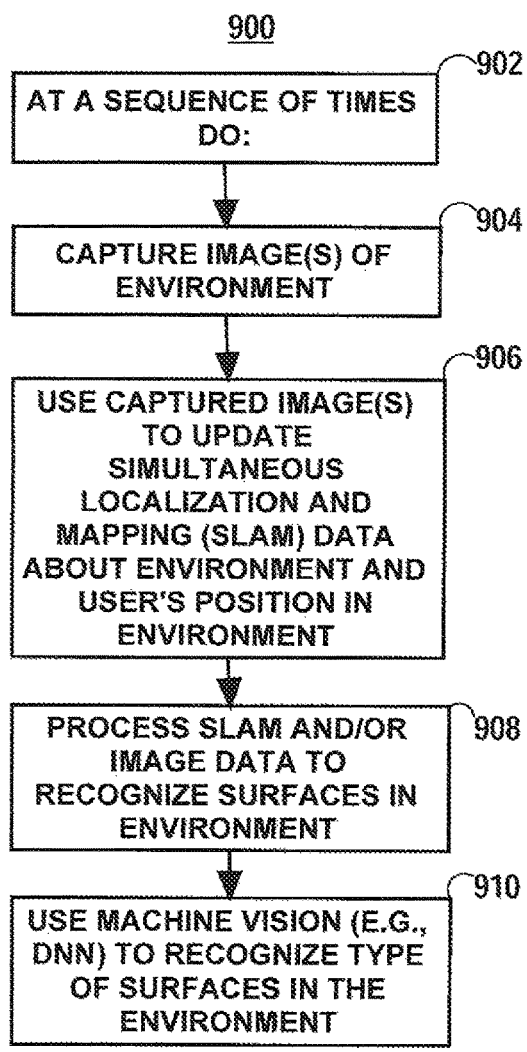
FIG. 9 is a flowchart of a method of using optical sensors to collect environmental information that is used to enhance the realisticness of audio signals associated with virtual content according to embodiments of the invention.

FIG. 9 is a flowchart of a method 900 of using optical sensors to collect environmental information that is used to enhance the realisticness of audio signals associated with virtual content. Block 902 is the top of loop that repeats for a sequence of times. In block 904 an image or images of the environment in which the headgear 102 is being used are captured. As indicated above the headgear 102 includes left and right depth cameras 142, 144. The image(s) collected in block 904 can therefore include depth information which can be used to recognize surfaces, which is not to say, that in an alternative in which non-depth cameras are used, the system 100 could not also recognize surfaces. In block 906 the image or images are used to update SLAM data about the environment and the user's position in the environment. Although not indicated in block 906 a visual odometry indication of the user's position in the environment may also be used. In block 908 the SLAM data and/or images are processed to recognize surfaces, e.g., walls, floors, ceilings, table tops, etc., in the environment. In the course of recognizing surfaces 3D points in a point cloud may be fit in a least square sense to planes. In block 910 machine vision, for example employing a Deep Neural Network (DNN), is used to recognize the type of surfaces in the environment of the headgear 102. For example the system 100 can discriminate hardwood versus carpeted floor and discriminate flat wall from textured walls each of which surfaces have different acoustic properties, e.g., different reflection coefficients.

Figure 10:
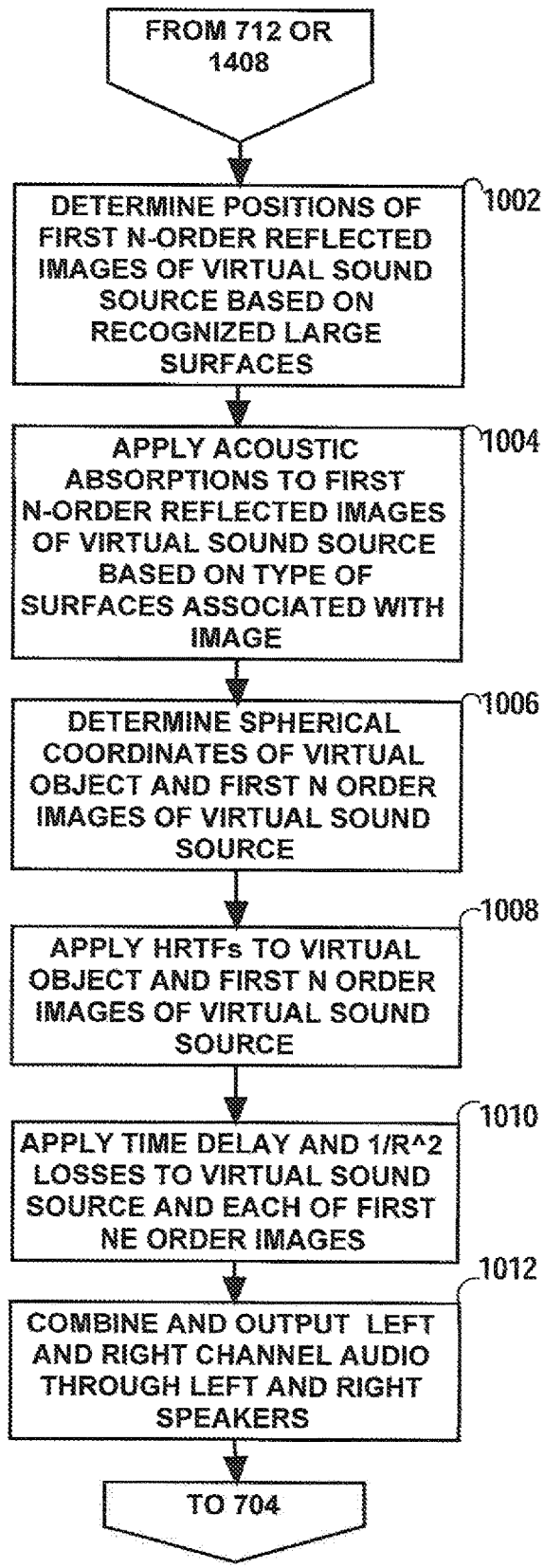
FIG. 10 is a flowchart of a method of using environmental information that has been collected by the method shown in FIG. 9 to generate spatialized audio in the methods shown in FIG. 7 and FIG. 14 according to embodiments of the invention.

FIG. 10 is a flowchart of a method 1000 of using environmental information that has been collected by the method shown in FIG. 9 to generate spatialized audio in the methods shown in FIG. 7 and FIG. 14. The method 1000 can be used to implement block 714 of method 700 or method 1400. In block 1002 the positions of the first N-order reflected images of the virtual sound source (the sound emitting virtual object displayed in blocks 712 or 1408) are determined based on the environmental surfaces that were recognized in block 908. The order of the reflection indicates the number of surfaces from which a virtual sound is simulated as bouncing off of on the way to user's position in the environment. The first order reflections of the virtual sound sources are displaced from the virtual sound source perpendicularly with respect to each particular environment surface by an amount equal to twice the distance between the virtual sound source and the particular environment surface. Each $K^{TH}$ order reflection is a reflection of a $(K-1)^{TH}$ order reflection in a particular environmental surface. Accordingly each $K^{TH}$ order reflection is displaced from its 'parent' $(K-1)^{TH}$ order reflection perpendicularly with respect to a particular environment surface that forms the $K^{TH}$ order reflection. By way of non-limiting example N may be set to two or three or four.

Figure 11:
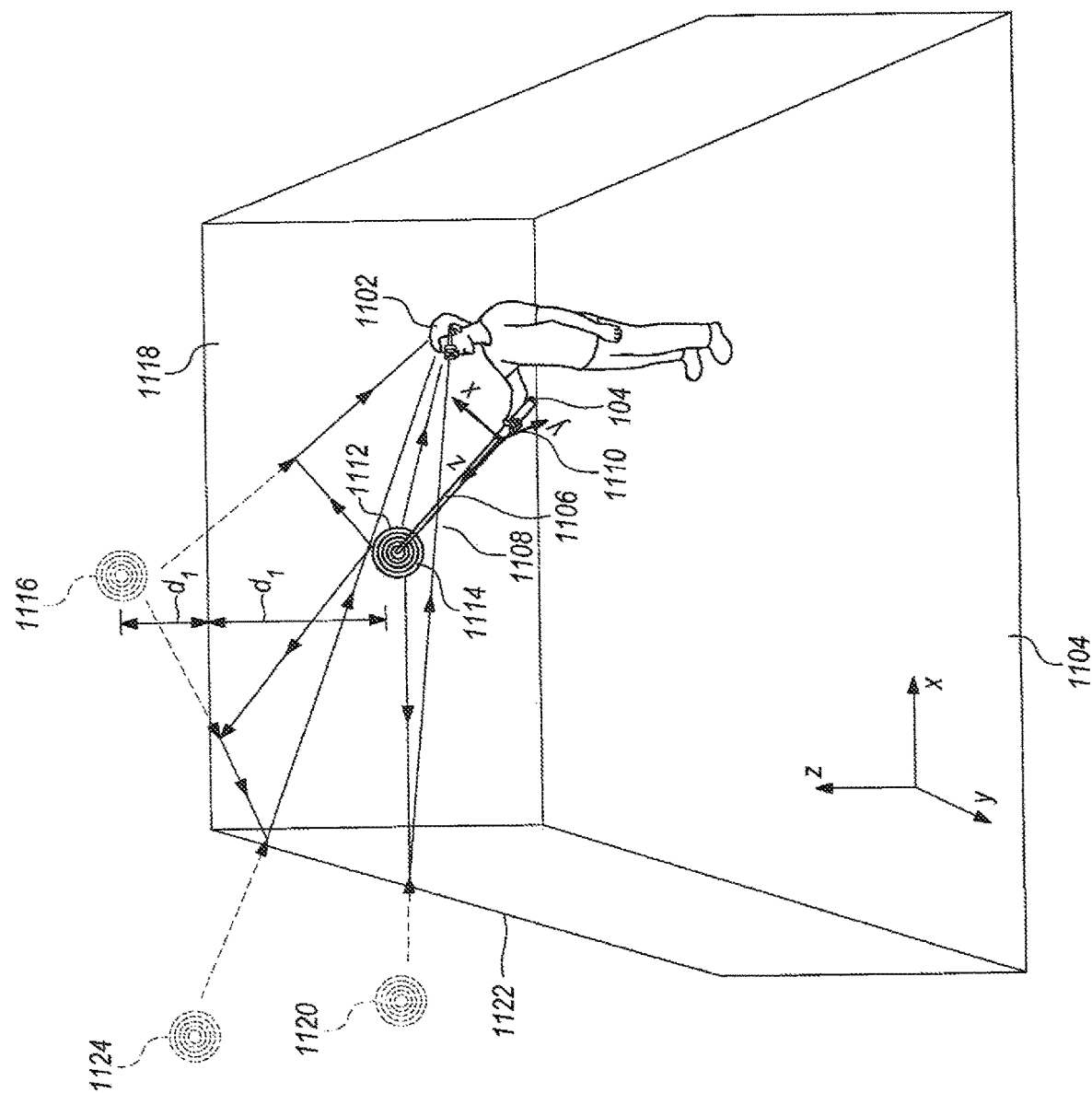
FIGS. 11-12 depict a user using the system described above with reference to FIGS. 1-10 and experiencing spatialized audio simulated to be emanating from a first virtual object that the user is manipulating with a controller such as shown in FIG. 1.

FIG. 11 shows a user 1102 in a schematically illustrated simple room 1104 wielding the handheld controller 104. In this case the handheld controller 104 serves as a real component handle of a mixed reality sword 1106. The mixed reality sword 1106 also includes a virtual component in the form of a blade 1108 of the sword 1106 which is maintained fixed to the handheld controller 104 (serving as the sword handle) by the system 100 following the method 700 described above with reference to FIG. 7. It is useful to consider a local coordinate system 1110 fixed to the handheld controller 104. In this case the virtual sword blade 1108 is maintained by the system 100 fixed to the handheld controller 104 and parallel to the Z axis of the local coordinate system 1110 that is fixed to the handheld controller 104. In this example a virtual sound source 1112 is fixed to a tip 1114 of the virtual sword blade 108. A first first-order image 1116 of the virtual sound source 1112 is located behind a back wall 1118 of the simple room 1104 and displaced perpendicularly to the back wall 1118 by a distance $2*d_1$ from the virtual sound source 1112, where $d_1$ is the distance between the virtual sound source 1112 and the back wall 1118. The path length of reflected sound associated with the first first-order image 1116 is equal to the distance from the first first-order image 1116 to the headgear 102. A second first-order image 1120 of the virtual sound source is located behind a side wall 1122. A first second-order image 1124 which is a reflection of the first first-order image 1116 in a left side wall 1122 is located behind the side wall 1122.

Referring again to block 1004 acoustic absorptions are applied to each particular audio source image of the up to N-order reflected images based on a surface type that was determined in block 910 for each surface involved in creating the particular audio source image. For example for first order images the virtual sound source involves only a single virtual reflection from a real world surface, whereas a second order image involves two virtual reflections from two real world surfaces.

In block 1006 the spherical coordinates of the virtual sound source (a point on the virtual object that is being controlled by the user) and the spherical coordinates of the first N-order reflected images of the virtual sound source are determined. The spherical coordinates of the first N-order reflected images are determined based on the positions of the first N-order reflected images determined in block 1002.

In block 1008 for the virtual sound source and for each of the reflections of the virtual sound source (up to $N^{TH}$ order) one or more HRTF are selected based on the spherical coordinates (with respect to the headgear 102) of the virtual sound source or particular reflection of the virtual sound source. Subsequently in block 1008 each particular selected HRTF's is applied to the virtual sound source or reflection for which the particular sound source was selected. The method described above that involves defining a set of virtual speakers and using VBAP may also be used to spatialize the reflections of the virtual sound source. The directly propagating and reflections of the virtual sound source may be delayed prior to be output to the user with delays based on directed or reflected propagation path length as the case may be.

In block 1010 a time delay and $1/R^2$ spreading loss is applied to the sound from each the virtual sound source and to the sound from each of the up to N-order images based on the propagation path length R between the virtual sound source or image thereof and the headgear 102. The time delay is based on the path length R and the speed of sound. The order of performing blocks 1004-1010 may be changed relative to what is shown in FIG. 10.

The HRTF for the virtual sound source and each of the images of the virtual sound source includes a left ear audio stream and a right ear audio stream. For the virtual sound source and for each of the images both the left and right ear audio streams are delayed and attenuated in block 1010 based on the aforementioned propagation path length. After block 1010 in block 1012 the left parts of the HRTF outputs for virtual sound source and its images are combined and likewise the right parts of the HRTF outputs for the virtual sound source its images are combined. Subsequently in block 1012 a resulting combined left audio stream is output through the left speaker 512 and left speaker port 134 and a resulting combined right audio stream is output through the right speaker 514 and right speaker port 136. Following the process 1000 leads to enhanced realisticness of the virtual reality component of the user's mixed (augmented) reality.

Figure 12:
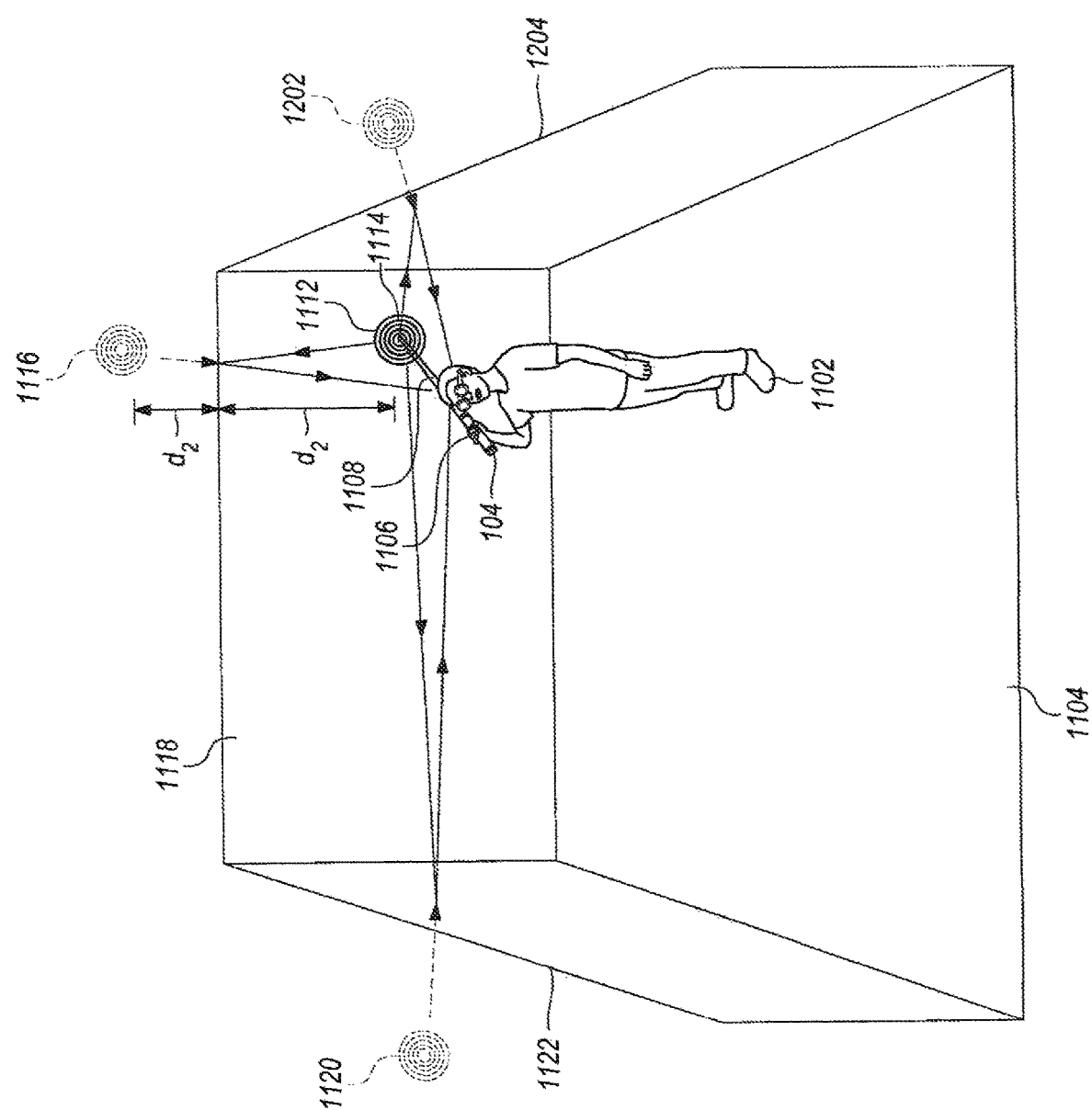

In FIG. 12 the user 1102 has moved the handheld controller 104 to the side of the user's head and tilted the handheld controller 104 back such that the tip 1114 of the virtual sword blade 1108 to which the virtual sound source 1112 is fixed is behind the user's head. Accordingly, the positions of the first first-order image 1116 and the second first-order image 1120 of the virtual sound source 1112 also changed positions. In FIG. 12 a third first-order image 1202 which is a virtual reflection of the virtual sound source 1112 in a right side wall 1204 is shown. In such position the virtual sword blade may out of the user's field of view but the user can still sense the location of the sword blade by hearing the spatialized audio from the virtual sound source 1112 fixed to the tip 1114 of the blade 1108. Upon reexecution of blocks 1002-1006 the spatialized audio associated with the virtual sound source 1112 that is fixed to the tip 1114 of the virtual sword blade 1108 is adjusted based on the new position of the virtual sound source 1112.

A frustum may be mathematically defined for use in the GPU to define select content to be output through the imagewise light modulators 124, 126 and the eyepieces 108, 110. The angular bounds of the frustum correspond to the field of view (FOV) provided by the sources of imagewise modulated light 124, 126 and the eyepieces 108, 110. Such a frustum may be oriented at some orientation in a common real world and virtual content coordinate system based on the head pose of the user which is determined using the headgear IMU 508 and the SLAM/visual odometry block 506. Information provided by the totem-to-headgear 6 DoF subsystems 502, 504 may be used to determine when a sound emitting virtual object that is being manipulated by the user by manipulation of the handheld controller 104 moves out of the aforementioned frustum. When the sound emitting virtual content object out of the frustum visual rendering of the sound emitting virtual object can be ceased, but emission of spatialized audio of the sound emitting virtual object can be continued.

Figure 13:
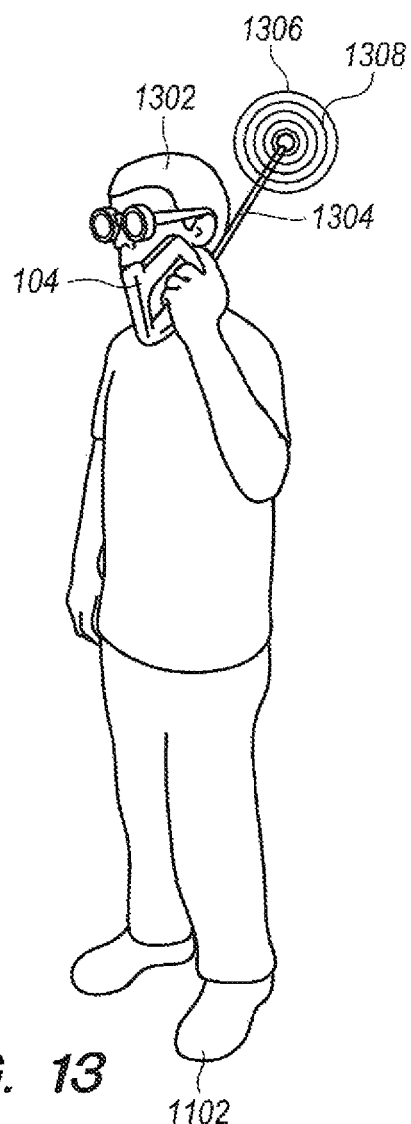
FIG. 13 depicts a user using the system described above with reference to FIGS. 1-10 and experiencing spatialized audio emanating from a second virtual object that the user is manipulating with a controller such as shown in FIG. 1.

FIG. 13 depicts a user 1302 using the system 100 described above with reference to FIGS. 1-10 and experiencing spatialized audio emanating from a second virtual object in the form a virtual magic wand 1304 that the user 1302 is manipulating with the handheld controller 104. The shape of the handheld controller 104 as shown in FIG. 13 differs from that shown in FIG. 1. A virtual sound source 1306 is fixed to a distal tip 1308 (displaced from handheld controller 104) of the virtual magic wand 1304. An appropriately chosen magic wand sound may be used.

FIG. 14 is a flowchart of a method 1400 of operating an augmented reality system according to another embodiment of the invention. Certain of the blocks of the method 1400 are in common with the method 700 shown in FIG. 7 and have reference numerals adopted from FIG. 7. Block 1402 represents the start of a loop that is repeated for a sequence of times. The sequence of times can be periodic or nonperiodic. In block 1404 the position of a user's hand relative to the headgear 102 is detected. The left and/or right depth cameras 142, 144 can be used to detect the position of the user's hand relative to the headgear 102. Detection of the user's hand can be achieved using pattern recognition applied to images obtained through the left and/or right depth cameras 142, 144. The depth cameras 142, 144 in combination with the processor 516 serve as a hand tracking machine vision subsystem for the purpose of executing blocks 1404 and 1406 described below. Depth and or color may be used in addition to grayscale imagery to distinguish the user's hand from the background.

In block 1406 a hand pose (hand gesture) is discriminated. A particular hand gesture can be discriminated by using pattern recognition applied to images obtained through the left and/or right depth cameras. Such pattern recognition can be based on training with multiple labeled images of hands in particular gestures.

In block 1408 an offset between a virtual object to be displayed and a user's hand is set. The offset may be fixed or programmed to vary according to certain rules, e.g., augmented reality game rules. The offset can include at least one degree of translation (e.g., an X, Y and/or Z offset) and/or at least one degree of rotation offset (e.g., a yaw, pitch and/or roll offset). For the purpose of determining an offset of a virtual object relative to the user's hand, a virtual coordinate system fixed to the user's hand at a prescribed orientation may be used. For example an X-Y plane of a virtual Cartesian coordinate system may be set coplanar with a palm of the user's hand. Precise initial alignment may not be critical. Tracking changes in the orientation of the user's palm as a function of time would be more impactful in the system 100 compared to the precision of initial alignment. In certain cases the virtual object position can be set to be proximate to the user's hand to emulate the user holding the virtual object.

In block 1410 the distance from the headgear 102 to the virtual object to be displayed is determined. The distance may be determined by adding a vector displacement from the headgear 102 to the user's hand as determined in block 1404 to a vector displacement between the user's hand and the virtual object to be displayed as determined in block 1408.

In block 710 a curvature of light used in displaying the virtual object is selected based on the distance to the virtual object.

In block 1412 the virtual object is displayed with at least one degree of freedom of motion fixed relative to the user's hand. The at least one degree of freedom corresponds to the offset set in block 1408.

In block 714 spatialized audio with a virtual source position fixed to a position on the displayed virtual object is output through the left and right speakers 512, 514 and the left and right speaker ports 134, 136.

The methods of operating the augmented reality system 100 that are described above with reference to FIGS. 7, 8, 9, 10 and 14 may be performed in response to user action under the control of the processor 516 (FIG. 5).

Figure 15:
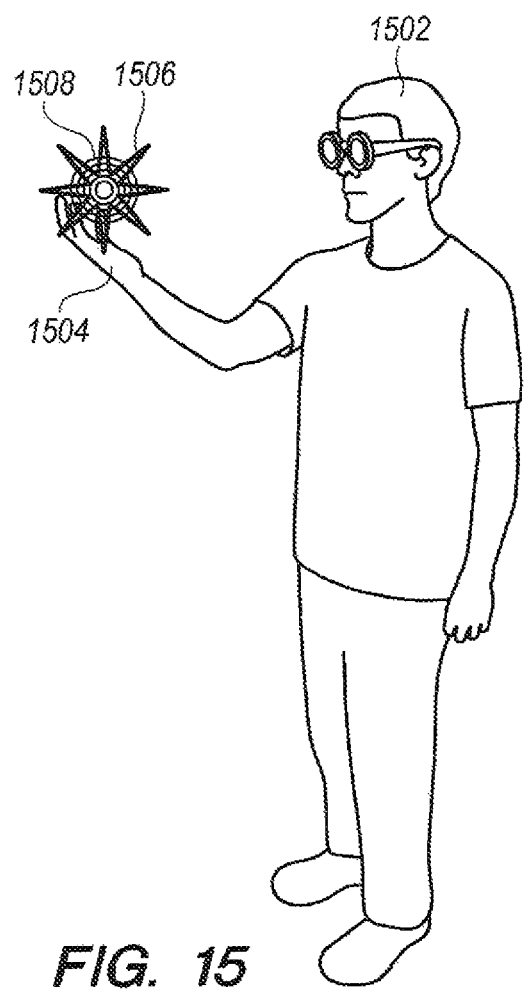
FIG. 15 depicts a user using an augmented reality system that is operating according to the method shown in FIG. 14.

FIG. 15 depicts a user 1502 using the augmented reality system 100 operating according to the method shown in FIG. 14. The user 1502 is holding in his hand 1504 a virtual object 1506 in the form of a fireball to which a virtual sound source 1508 is fixed. The system 100 can use the left and or right depth cameras 142, 144 and pattern recognition software running on the processor 516 to detect the user's hand 1504 and determine a gesture (e.g., open hand gesture, throwing gesture) of the user's hand 1504. The system 100 can then use the GPU scene renderer 520, the left and right imagewise light modulators 124, 126 and the left and right eyepieces 108, 110 to display the virtual object 1506 in the user's hand 1504. In response to detecting a throwing motion, the system 100 can impart a velocity to the virtual object 1506 where the velocity is defined in an inertial reference frame fixed to an environment (e.g., room 1104) within which the user 1502 is situated. More generally, in certain embodiments at least one kinematic parameter (e.g., position, velocity, and/or acceleration) is changed in response to detecting a gesture of the user's hand. The motion of the virtual object can be maintained irrespective of the movement of the user (although the virtual object may pass beyond the field of view of the user at any given instant it may again return to user's field of view). The system 100 can further be programed to bounce the virtual object from virtual representations of real physical walls. All along the virtual sound source 1508 is fixed to the virtual object 1506 and the user can by sound as well as by sight detect the location of the virtual object. In a game application the virtual object 1506 can be programmed to evade the user.

Virtual representations of real world objects can be generated by using 3-D point cloud data obtained from depth cameras or stereo cameras, or a camera capturing a scene while in motion (any of which may be embodied in cameras 142, 144, FIG. 1) and then fitting the 3-D point cloud date to primitive forms. For example a 3-D mesh representation of complex geometry may be used, or in the case of walls least square regression can be used to fit 3-D point cloud data to planes. Subsets of 3-D point clouds can be identified as corresponding to walls if such subsets are within a predetermined distance of planes which fit the subsets in a least square sense. Such planes serve as virtual surrogates for real walls and may be used to compute virtual object bounces from the walls and to compute acoustic reflections of virtual sound source waves from the walls as depicted in FIGS. 11-12. Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

The breadth of the present invention is not to be limited to the examples provided and/or the subject specification, but rather only by the scope of claim language associated with this disclosure.

What is claimed is:

1. An augmented reality system comprising: a handheld controller; a wearable headgear unit including: a left eye display comprising a transmissive eyepiece; a right eye display comprising a transmissive eyepiece; a left side speaker; and a right side speaker; first tracking components; and circuitry coupled to the left eye display, the right eye display, the left side speaker, the right side speaker, and the first tracking components wherein the circuitry is configured to: identify, via the first tracking components, a position of the handheld controller relative to the wearable headgear unit; output, based on the identified position, one or more signals to the left eye display and the right eye display to display, via one or more of the transmissive eye piece of the left eye display and the transmissive eyepiece of the right eye display, a view of a virtual object and a view of the handheld controller, the view of the virtual object substantially fixed relative to the view of the handheld controller, wherein the virtual object includes at least one rotational degree of freedom; and output spatialized audio that includes a left channel audio signal that is output to the left side speaker and a right channel audio signal that is output to the right side speaker, wherein the spatialized audio is associated with a virtual sound source location that is substantially fixed relative to the handheld controller.

2. The augmented reality system according to claim 1, wherein the circuitry is further configured to receive one or more signals indicative of an orientation of the handheld controller relative to the wearable headgear unit via the first tracking components.

3. The augmented reality system according to claim 1, wherein the circuitry is configured to generate the left channel audio signal and the right channel audio signal by applying at least one head related transfer function to a mono audio signal.

4. The augmented reality system according to claim 1, further comprising: second tracking components coupled to the circuitry, wherein the circuitry is further configured to receive, via the second tracking components, one or more signals indicative of a position and orientation of the wearable headgear unit relative to a real world environment.

5. The augmented reality system according to claim 1, wherein the handheld controller is visible through the left eye display and right eye display.

6. The augmented reality system according to claim 1, wherein the wearable headgear unit further comprises one or more of the first tracking components.

7. The augmented reality system according to claim 1, wherein the handheld controller further comprises one or more of the first tracking components.

8. The augmented reality system according to claim 1, wherein the virtual object comprises at least one coordinate fixed relative to the handheld controller.

9. An augmented reality system comprising: a wearable headgear unit including: a left eye display comprising a transmissive eyepiece; a right eye display comprising a transmissive eyepiece; a left side speaker; and a right side speaker; a hand tracking machine vision subsystem; and circuitry coupled to the left eye display, the right eye display, the left side speaker, the right side speaker, and the hand tracking machine vision subsystem, wherein the circuitry is configured to:
identify, via the hand tracking machine vision subsystem, a position of a hand of a user relative to the wearable headgear unit;
output, based on the identified position, one or more signals to the left eye display and the right eye display to display, via one or more of the transmissive eyepiece of the left eye display and the transmissive eyepiece of the right eye display, a view of a virtual object and a view of the hand, the view of the virtual object fixed relative to the view of the hand, wherein the virtual object includes at least one rotational degree of freedom; and
output spatialized audio that includes a left channel audio signal that is output to the left side speaker and a right channel audio signal that is output to the right side speaker, wherein the spatialized audio is associated with a virtual sound source location that is substantially fixed relative to the hand.

10. The augmented reality system according to claim 9, wherein the circuitry is further configured to identify, via the hand tracking machine vision subsystem, a gesture of the hand and to adjust at least one kinematic parameter of the virtual object in response to identifying the gesture.

11. The augmented reality system according to claim 9, wherein the circuitry is configured to generate the left channel audio signal and the right channel audio signal by applying at least one head related transfer function to a mono audio signal.

12. The augmented reality system according to claim 9, wherein the wearable headgear unit further comprises one or more components of the hand tracking machine vision subsystem.

13. The augmented reality system according to claim 9, further comprising a handheld controller, wherein the handheld controller further comprises one or more components of the hand tracking machine vision subsystem.

14. The augmented reality system according to claim 9, wherein the virtual object comprises at least one coordinate fixed relative to the view of the hand.

15. An augmented reality system comprising: a wearable headgear unit including: a left eye display comprising a transmissive eyepiece; a right eye display comprising a transmissive eyepiece; a left side speaker; and a right side speaker; one or more receivers; and
circuitry coupled to the left eye display, the right eye display, the left side speaker, the right side speaker, and the one or more receivers, wherein the circuitry is configured to:
output signals to the left eye display and the right eye display to display, via one or more of the transmissive eyepiece of the left eye display and the transmissive eyepiece of the right eye display, a view of a virtual object, wherein the virtual object includes at least one rotational degree of freedom;
output spatialized audio that includes a left channel audio signal that is output to the left side speaker and a right channel audio signal that is output to the right side speaker, wherein the spatialized audio is associated with a virtual sound source location that is substantially fixed relative to the virtual object; and receive user input through the one or more receivers and in response to receiving the user input through the one or more receivers, change a location of the virtual object and change the at least one virtual sound source location.

16. The augmented reality system according to claim 15, wherein the one or more receivers comprise a hand tracking machine vision subsystem.

17. The augmented reality system according to claim 16, wherein the one or more receivers comprise a handheld controller.

18. The augmented reality system according to claim 15, wherein the wearable headgear unit further comprises the one or more receivers.

19. The augmented reality system according to claim 15, further comprising a handheld controller, wherein the handheld controller comprises the one or more receivers.

20. The augmented reality system according to claim 15, further comprising a handheld controller, wherein the virtual object comprises at least one coordinate fixed relative to the handheld controller.

* * * * *